US008099142B2

(12) United States Patent
Zhu et al.

(10) Patent No.: US 8,099,142 B2
(45) Date of Patent: Jan. 17, 2012

(54) MOBILE WIRELESS COMMUNICATIONS DEVICE HAVING IMPROVED RF IMMUNITY OF AUDIO TRANSDUCERS TO ELECTROMAGNETIC INTERFERENCE (EMI)

(75) Inventors: Lizhong Zhu, Waterloo (CA); George Mankaruse, Kitchener (CA); Michael Corrigan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/073,293

(22) Filed: Mar. 28, 2011

(65) Prior Publication Data

US 2011/0172002 A1 Jul. 14, 2011

Related U.S. Application Data

(63) Continuation of application No. 12/025,837, filed on Feb. 5, 2008, now Pat. No. 7,974,582, which is a continuation of application No. 11/098,275, filed on Apr. 4, 2005, now Pat. No. 7,353,041.

(51) Int. Cl.
*H04M 1/00* (2006.01)
*H01S 4/00* (2006.01)
(52) U.S. Cl. .................... 455/575.1; 29/592.1
(58) Field of Classification Search .............. 455/575.1, 455/575.2, 90.3, 550.1, 556.1, 556.2, 68.1, 455/569.1, 296, 300, 570, 67.13, 412.2, 517, 455/569.2, 419, 552, 1 M, 66.1, 418, 234.1, 455/631.1, 14.2, 278.1; 29/592.1; 439/78, 439/73, 76.1; 379/167.15, 43.03, 430; 381/71, 381/318, 94, 91, 111, 116, 1, 55, 189, 365; 361/816, 817, 818
See application file for complete search history.

(56) References Cited

U.S. PATENT DOCUMENTS

| | | | |
|---|---|---|---|
| 4,187,481 A | 2/1980 | Boutros | 333/182 |
| 5,117,073 A | 5/1992 | Mischenko | 200/61.7 |
| 5,165,055 A | 11/1992 | Metsler | 333/12 |
| 5,596,638 A | 1/1997 | Paterson et al. | 379/430 |
| 5,621,363 A | 4/1997 | Ogden et al. | 333/12 |
| 5,764,693 A | 6/1998 | Taylor et al. | 375/222 |
| 5,911,121 A | 6/1999 | Andrews | 455/418 |
| 5,963,588 A | 10/1999 | Yatim et al. | 375/222 |
| 6,207,912 B1 | 3/2001 | Persson | 200/305 |
| 6,307,944 B1 | 10/2001 | Garratt et al. | 381/312 |
| 6,628,508 B2 | 9/2003 | Lieu et al. | 361/680 |
| 6,647,367 B2 | 11/2003 | McArthur et al. | 704/226 |
| 6,654,593 B1 | 11/2003 | Simmons et al. | 455/234.1 |
| 6,742,185 B1 | 5/2004 | Andrews | 725/75 |
| 6,823,176 B2 | 11/2004 | Rogers | 455/67.13 |
| 6,867,763 B2 | 3/2005 | Griffin et al. | 345/168 |
| 7,027,841 B2 | 4/2006 | Ishii | 455/569.1 |
| 7,266,390 B2 | 9/2007 | Mathews | 455/556.1 |

(Continued)

FOREIGN PATENT DOCUMENTS

EP 0805562 11/1997

(Continued)

*Primary Examiner* — Melody Mehrpour
(74) *Attorney, Agent, or Firm* — Allen, Dyer, Doppelt, Milbrath & Gilchrist, P.A.

(57) ABSTRACT

A mobile wireless communications device includes a housing and circuit board carried by the housing and having radio frequency (RF) circuitry and a processor operative with each other. Audio circuitry is carried by the circuit board and an audio transducer assembly, such as a speaker, has electrical contacts that electrically engage the audio circuitry for carrying audio signals between the audio circuitry and audio transducer assembly. A filter is mounted at the audio transducer assembly and reduces radio frequency (RF) electromagnetic interference to the audio transducer assembly during device operation.

22 Claims, 8 Drawing Sheets

U.S. PATENT DOCUMENTS

| | | | |
|---|---|---|---|
| 7,302,234 B1 | 11/2007 | Fessler et al. | 455/67.13 |
| 7,328,047 B2 | 2/2008 | Zhu et al. | 455/566 |
| 7,330,737 B2 | 2/2008 | Mahini | 455/557 |
| 7,353,041 B2 | 4/2008 | Zhu et al. | 455/550.1 |
| 7,369,868 B2 | 5/2008 | Dunko et al. | 455/517 |
| 7,444,174 B2 | 10/2008 | Zhu et al. | 455/575.1 |
| 7,480,523 B2 | 1/2009 | Zhu et al. | 455/575.1 |
| 2002/0106091 A1 | 8/2002 | Furst et al. | 381/91 |
| 2002/0123308 A1 | 9/2002 | Feltstrom | 455/63 |
| 2003/0059071 A1 | 3/2003 | Dunham | 381/309 |
| 2003/0066672 A1 | 4/2003 | Watchko et al. | 174/50 |
| 2003/0202664 A1 | 10/2003 | Brodkin | 381/1 |
| 2004/0081099 A1 | 4/2004 | Patterson et al. | 370/241 |
| 2004/0136543 A1 | 7/2004 | White et al. | 381/74 |
| 2004/0178995 A1 | 9/2004 | Sterling | 345/173 |
| 2004/0208334 A1 | 10/2004 | Bryson et al. | 381/365 |
| 2005/0075691 A1 | 4/2005 | Phillips et al. | 607/60 |
| 2005/0090295 A1 | 4/2005 | Ali et al. | 455/575.2 |
| 2005/0123025 A1 | 6/2005 | Sorrells et al. | 375/130 |
| 2006/0039454 A1 | 2/2006 | Cioffi | 375/222 |
| 2006/0046770 A1 | 3/2006 | Zhu et al. | 455/550.1 |
| 2006/0046787 A1 | 3/2006 | Zhu et al. | 455/566 |
| 2006/0120499 A1 | 6/2006 | Simmons et al. | 375/368 |
| 2006/0172780 A1 | 8/2006 | Krippgans | 455/569.2 |

FOREIGN PATENT DOCUMENTS

| | | |
|---|---|---|
| EP | 1467434 | 10/2004 |
| GB | 2381956 | 5/2003 |
| JP | 05121891 | 5/1993 |
| WO | 2004/086587 | 7/2004 |
| WO | 02/25975 | 3/2005 |

MOBILE WIRELESS COMMUNICATIONS DEVICE HAVING IMPROVED RF IMMUNITY OF AUDIO TRANSDUCERS TO ELECTROMAGNETIC INTERFERENCE (EMI)

RELATED APPLICATIONS

This application is a continuation of Ser. No. 12/025,837 filed Feb. 5, 2008 now U.S. Pat. No. 7,974,582, which, in turn, is a continuation of Ser. No. 11/098,275 filed Apr. 4, 2005 now U.S. Pat. No. 7,353,041 issued Apr. 1, 2008, all of which are hereby incorporated herein in their entireties by reference.

FIELD OF THE INVENTION

The present invention relates to the field of communications devices, and more particularly, to mobile wireless communications devices and related methods.

BACKGROUND OF THE INVENTION

Cellular communication systems continue to grow in popularity and have become an integral part of both personal and business communications. Cellular telephones allow users to place and receive phone calls most anywhere they travel. Moreover, as cellular telephone technology is increased, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

As the functionality of cellular communications devices increases, the demand increases for smaller devices that are easier and more convenient for users to carry. As any circuit boards and electronic components thereon are reduced in size and placed closer together, including antenna and microphone components, various electronic components pick-up conductive energy and create interference within the system. For example, an internal audio transducer, for example, a receiver speaker, such as a speaker surface mounted on the circuit board, could pick-up conducted energy directly from a power amplifier, from the radiated energy emitted by an antenna or from other circuitry and, as a result, create an audible buzz within the speaker. This unwanted reception of conducted/near field radiated energy from any power amplifiers, antennae and RF or other circuitry is particularly problematic in a packet burst transmission as part of a Global System for Mobile communications (GSM) system; including the 450 MHz, 900 MHz, 1800 MHz and 1900 MHz frequency bands. Other interfering signals that could create an audible buzz in the speaker could be generated when the liquid crystal display (LCD) in some mobile wireless communications devices radiates radio frequency (RF) interfering energy. Interfering energy could also be generated by the microprocessor or another similar central processing unit (CPU).

Other problems occur when the antenna impendence match is detuned and antenna gain is degraded by the coupling of adjacent electronic components, for example, the receiver speaker relative to the antenna. It would be desirable to improve antenna performance of the mobile wireless communications device by blocking RF current from being coupled to the ground plane of the printed circuit board through adjacent electronic components. For example, the receiver is typically located close to the antenna and couples RF energy from the antenna to the ground plane, detuning an antenna impedance match and degrading antenna gain.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
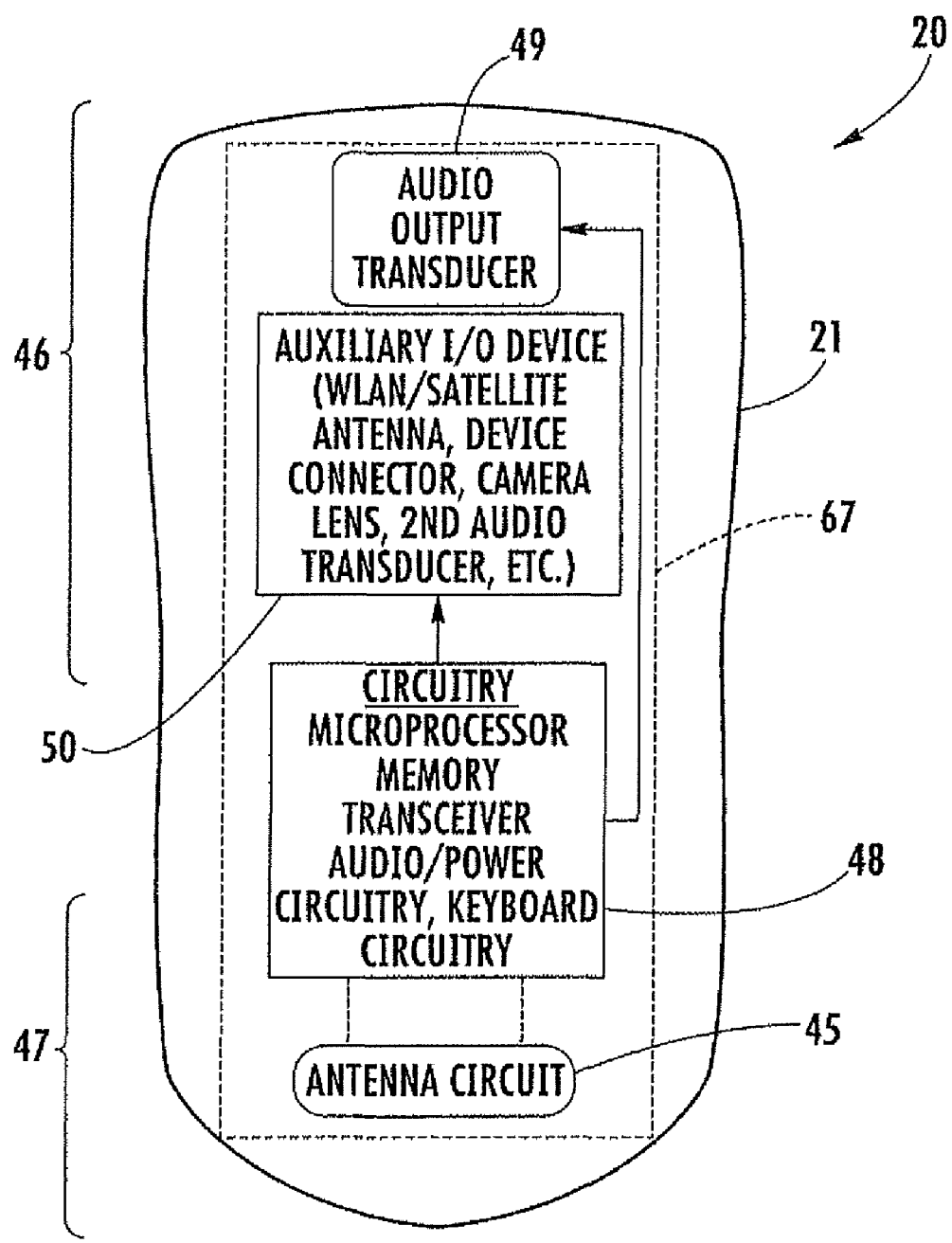
FIG. 1 is a schematic block diagram of an example of a mobile wireless communications device configured as a handheld device that can be used with the present invention and illustrating basic internal components thereof.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The RF filter of the invention targets the audio buzz problem created by RF electromagnetic interference on mobile wireless audio transducers, such as a receiver speaker. The RF filter is operative with the audio transducer, for example, attached to the transducer housing, to the transducer electrical contacts, such as resilient (spring) pads, or to the audio circuitry, for example, the audio connection lines, e.g., the signal traces leading to the audio transducer. The RF filter could be RF ferrite beads, serially connected inductors, or shunt capacitors to reduce the RF energy that is picked-up by the transducer. Energy is coupled to the non-linear circuit that could rectify the RF energy. In another aspect, an isolation RF shield as a "can" could surround and isolate the speaker from radiated energy.

In another aspect of the present invention, RF current is blocked from being coupled to the ground plane of the printed circuit board via the electronic components that are located close to an antenna, thus improving the antenna performance. For example, in some wireless mobile communications devices, the audio transducer, e.g., the receiver speaker, is located close to the antenna and couples RF energy from the antenna to the ground plane. This detunes the antenna impedance and degrades antenna gain. The RF filters can also be added serially to both ends of the speaker, which have a low DC resistance to allow normal operation of the speaker, but high impedance over 500 MHz and up to 3 GHz. The addition of the RV filter can block the RF current from being coupled to the ground plane and other circuitry on the printed circuit board and decouple the antenna from any adjacent electronic components. In this manner, the antenna performance is maintained, for example, maintaining impedance match and antenna gain.

A mobile wireless communications device of the present invention includes a housing and circuit board carried by the housing and including radio frequency (RF) circuitry and a processor operative with each other. Audio circuitry is carried by the circuit board and operative with the RF circuitry and processor. An audio transducer assembly, such as a receiver speaker, is carried by the circuit board and has electrical contacts that electrically engage the audio circuitry for carrying audio signals between the audio circuitry and audio transducer assembly. A filter is mounted at the audio transducer assembly and reduces the radio frequency (RF) electromagnetic interference to the audio transducer assembly during device operation.

In one aspect of the invention, the filter could be an RF shield or "can" that surrounds or encloses all or a portion of the transducer, or a ferrite bead, serial inductor, or bypass capacitor connected to signal lines of the transducer. The audio circuitry could include a receiver audio switch and audio connection lines carried by the circuit board that interconnect the RF circuitry, processor and receiver audio switch. The transducer, e.g., speaker, can be surface mounted on the circuit board and has electrical contacts that electrically engage the audio circuitry for carrying the audio signals between the audio circuitry and transducer. The filter can be serially connected between the audio circuitry and the electrical contact of the transducer. In one aspect of the present invention, the audio transducer includes a transducer housing with the filter positioned within the audio transducer housing. The electrical contacts can be formed as resilient or "spring" contact pads that engage the audio circuitry.

In another aspect of the present invention, the filter can be located between the audio transducer housing and resilient contact pads. The filter could be formed as a surface mounted device positioned adjacent the electrical contacts and engaging the audio circuitry.

Figure 2:
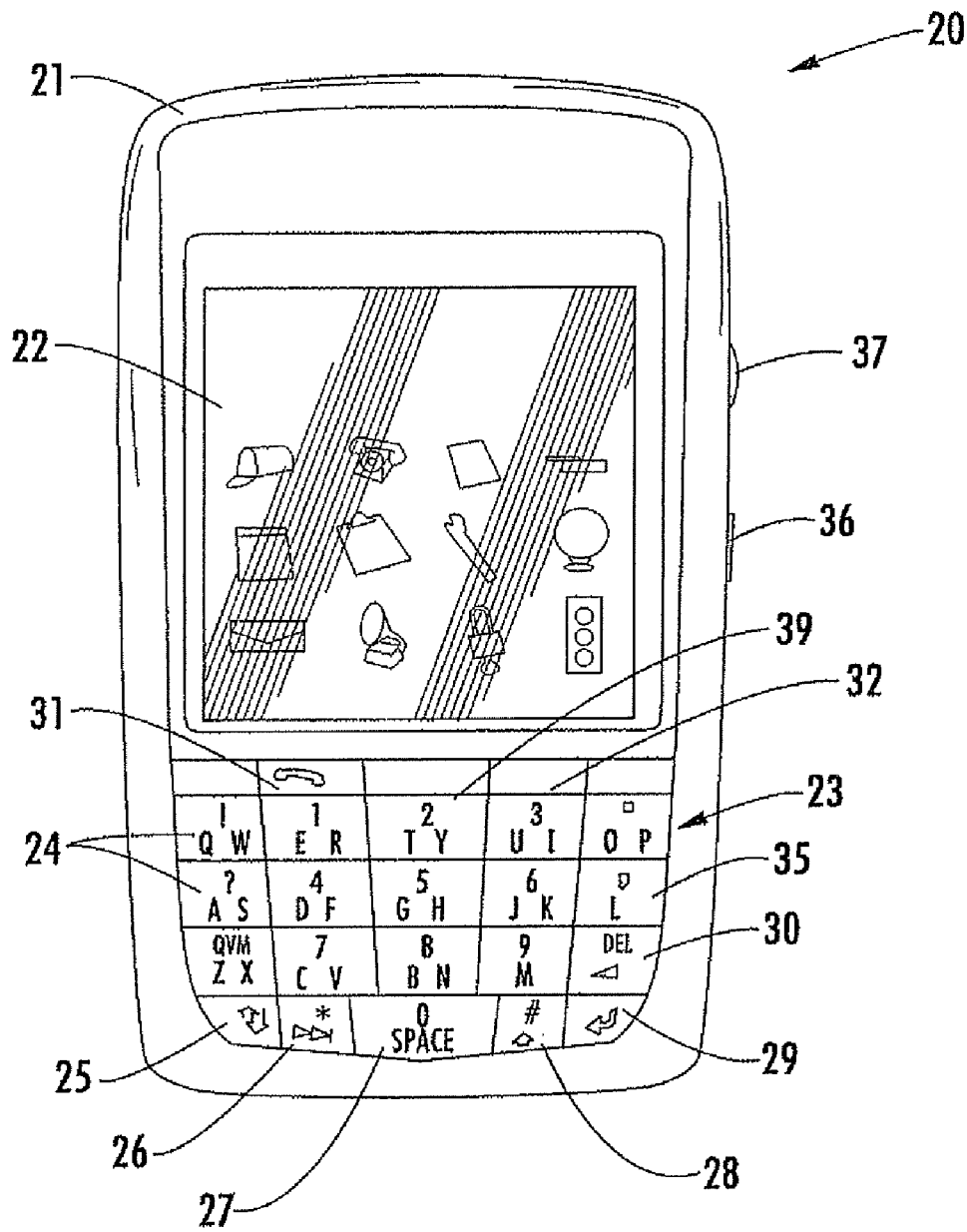
FIG. 2 is a front elevation view of the mobile wireless communications device of FIG. 1.
Figure 3:
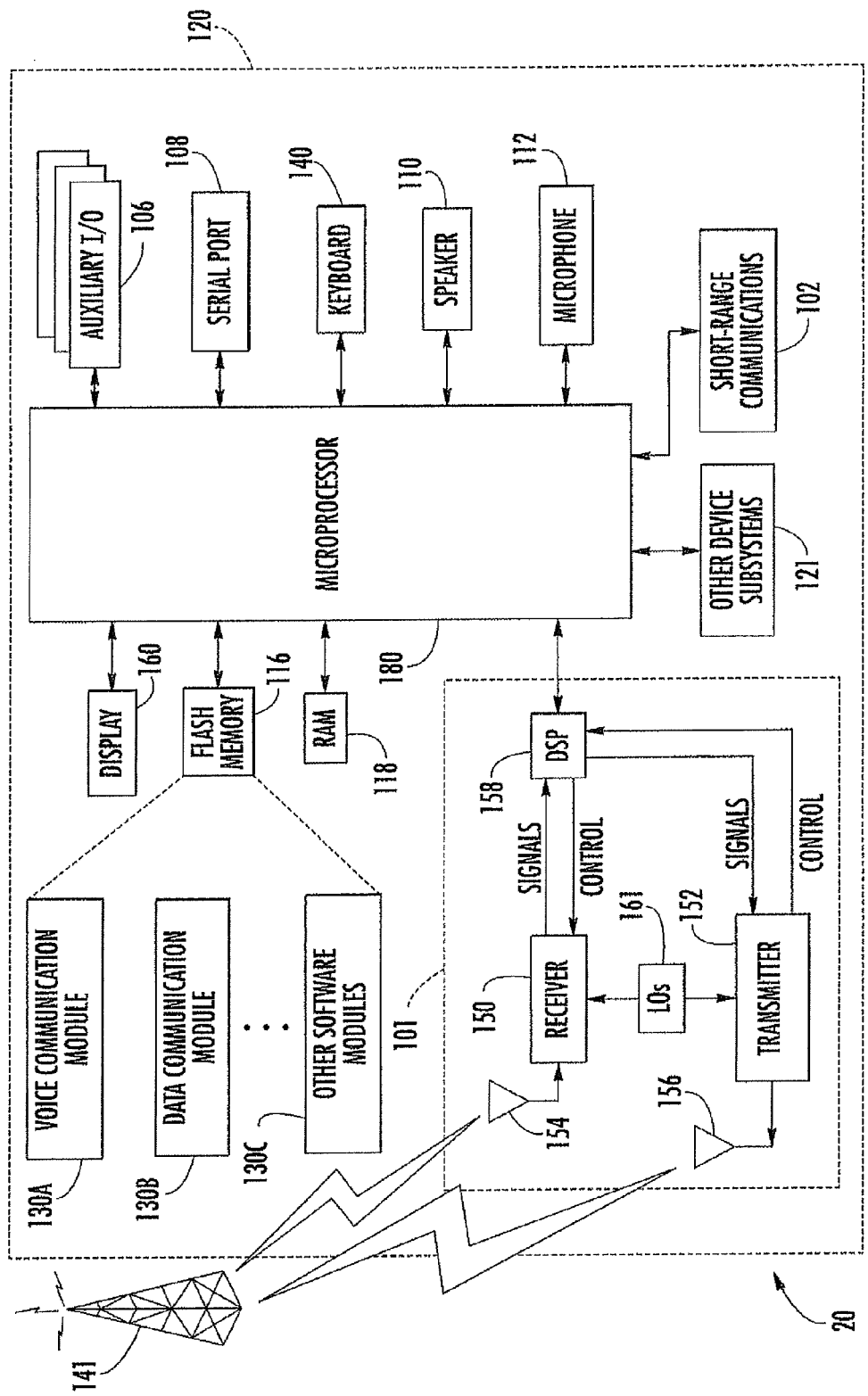
FIG. 3 is a schematic block diagram showing basic functional circuit components that can be used in the mobile wireless communications device of FIGS. 1-2.

A brief description will now proceed relative to FIGS. 1-3, which disclose an example of a mobile wireless communications device, for example, a handheld portable cellular radio, which can incorporate the non-limiting examples of the various circuits of the present invention. FIGS. 1-3 are representative non-limiting examples of the many different types of functional circuit components and their interconnection, and operative for use with the present invention.

Referring initially to FIGS. 1 and 2, an example of a mobile wireless communications device 20, such as a handheld portable cellular radio, which can be used with the present invention is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing. A housing cover (not shown in detail) would typically cover the front portion of the housing. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, as opposed to a flip or sliding housing which are used in many cellular telephones. However, these and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also preferably carried by the housing 21 for supplying power to the circuitry 48. The term RF circuitry could encompass the interoperable RF transceiver circuitry, power circuitry and audio circuitry.

Furthermore, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna 45 is preferably positioned at the lower portion 47 in the housing and can be formed as a pattern of conductive traces that make an antenna circuit, which physically forms the antenna. It is connected to the circuitry 48 on the main circuit board 67. In one non-limiting example, the antenna could be formed on an antenna circuit board section that extends from the main circuit board at the lower portion of the housing. By placing the antenna 45 adjacent the lower portion 47 of the housing 21, the distance is advantageously increased between the antenna and the user's head when the phone is in use to aid in complying with applicable SAR requirements. Also, a separate keyboard circuit board could be used.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25-29) is arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

The mobile wireless communications device shown in FIGS. 1 and 2 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120, a keypad 140 and an output device 160. The output device 160 shown is preferably a display, which is preferably a full graphic LCD. Other types of output devices may alternatively be used, A processing device 180 is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOS) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180, The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

Figure 4:
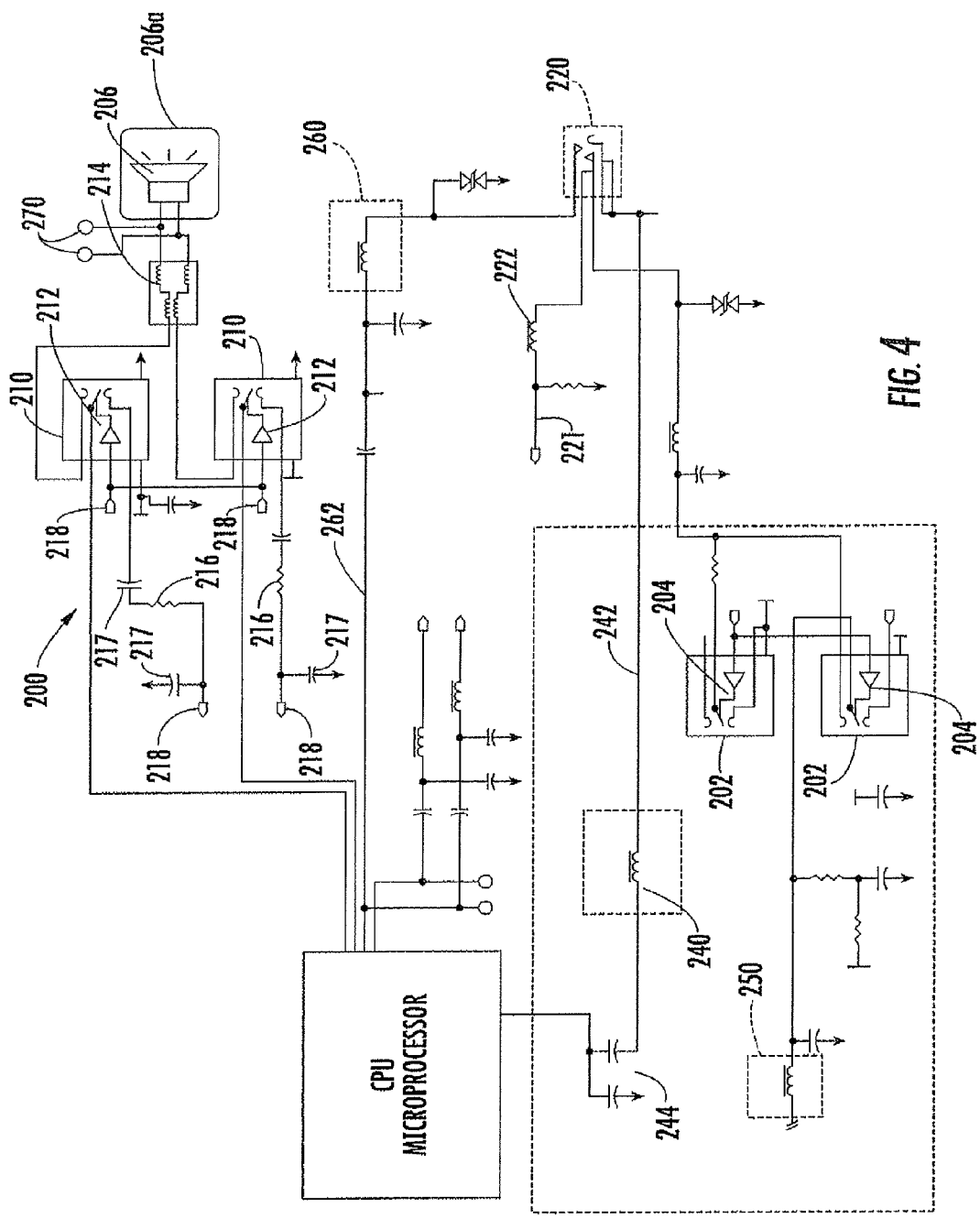
FIG. 4 is a schematic circuit diagram of an audio circuit operative with an RF circuit in the mobile wireless communications device of FIGS. 1-3, and incorporating RF filters applied to the audio transducer, such as the illustrated receiver speaker, in accordance with the present invention.

FIG. 4 shows a basic audio circuit 200, including serial bus connections that can be used for mobile wireless communications device 20 shown in FIGS. 1-3, and includes an audio transducer, such as the receiver speaker 206. FIGS. 6-9 illustrate different RF components added into or near the receiver speaker 206, in accordance with the invention. This audio circuit 200 also has certain types of values of filters placed around the device to reduce immunity.

Basic audio components are shown in the dashed rectangular box and include two microphone audio switches 202, which include a headset detect circuit 204 that is triggered when the headset jack has an external speaker microphone connected thereto. It detects the microphone and switches the lines over. At the audio transducer assembly, hereinafter referred to as the receiver speaker or speaker 206, are two speaker audio switches 210, each with a detect circuit 212 that detects when an earphone is connected to switch the line over. An inductor component 214 as a filter is operative with the receiver speaker 206 and the audio switches 210. As shown in greater detail in the enlarged schematic circuit diagrams in FIGS. 6-9, different resistor 216, capacitor 217 and terminals 218 are operatively connected to switches 210.

An example of the audio switch could be a 0.5 ohm/0.8 ohm low-voltage, dual single-pole/double-throw (SPDT) analog switch that could operate from a single 1.8 volt to 5.5 volt supply. An example of such a switch is the Maxim 4684 and 4685, low-on resistance (R on) switches. These switches are packaged in a chip scale package (UCSF) that reduces the required printed circuit board area. A chip of this type typically occupies about 2.0 mm by 1.50 mm area. A 4×3 array of solder bumps can be spaced with a 0.5 mm bump pitch. Proper power-supply sequencing would typically be required for CMOS devices. The different pins could include a normally closed terminal pin, a digitally controlled input pin, an analog switch, common terminal pin, an analog switch normally open terminal pin, a positive supply voltage input pin, and a ground pin.

The receiver speaker could be a 28 mm speaker such as the type WD11903 by Phillips Speaker Systems. It is typically formed with a frame/volume of ABS/SAN, and a cone formed from polycarbonate (PC). The cone color could be yellow transparent and the weight is about 4.9 grams. The diameter is 28 mm. The magnet could be formed from NdFeB material and is about 12 mm. The speaker could include a resilient contact pad forming a spring-contact connection, and a parallel ZU PCB gasket and a PC RING. This type of speaker could operate at a range of about 560 Hz to 5,000 Hz and typically within the voice range. It would have a resonant frequency of about 700 Hz and a voice coil resistance of about 7.3 Ohms. It could use about 1 watt maximum short term power and a maximum noise power of about 0.5 watts continuous.

To provide the speaker 206 with RF isolation, FIG. 4 shows that a radio frequency isolation shield 206a can form an isolation "can," i.e., an isolation compartment at that area of the circuit board in which the speaker is mounted. This RF shield 206a could be formed as a separate metallic housing secured to the circuit board and surrounding the speaker, effectively covering, i.e., shielding the entire speaker. Naturally, some porous holes could be provided to allow sound to escape. Although a "can" configuration formed as a metallic housing with top and sides can be used for the RF shield 206a, other configurations could be used. The receiver is typically and preferably, in one aspect, a surface mounted receiver such as the receiver speaker described above. This RF shield provides the necessary isolation from the RF amplifiers, power circuitry, radiated antenna energy, and other interfering RF energy that could create an audible buzz within the speaker.

In another aspect of the invention described below, the RF filter could be ferrite beads, bypass capacitors, or serial inductors and placed within the speaker housing or outside the speaker and connected into the audio connection lines. It should be understood that the term "speaker" could also be synonymous with any type of audio transducer assembly that is carried by the housing of the wireless communications device, but typically mounted on the circuit board.

Different types, sizes and shapes of ferrite beads can be used Typically, a ferrite bead is formed from a material having a permeability controlled by the composition of the different oxides, for example, a ferric oxide, sometimes with nickel and zinc added. The ferrite beads can sometimes be formed as ferrite sleeves with two half parts that are added onto a signal line or a solder overcoat on a signal trace. Typically, the longer the bead, the better the RF suppression. The bead equivalent circuit can be a series resistor and inductor.

A physical jack is indicated at 220 and receives a jack input and connects to headset detect line and terminal 221, which also includes a serially connected inductor 222. The described components are connected together and operative with the microprocessor and other components, for example, various inductors, diodes, capacitors, resistors, and associated circuit components.

To increase the immunity (i.e., reduce the susceptibility) of the device 20 to electromagnetic interference (EMI), a plurality of EMI filters are added to the audio and/or serial bus circuit 200 of the communications device 20. As shown in FIG. 4, for example, choke filters (i.e., inductors) can include respective individual inductors for this purpose. A choke filter 240 is operatively connected into connection line 242 between the physical jack 220 and the microprocessor 180. This connection line 242 includes a capacitor circuit 244. Another choke filter 250 is operatively connected to the microphone audio switches 202. Yet another choke filter 260 is operatively connected to the physical jack 220 and the microprocessor 180 on a connection line 262. Although the inductor or choke filters as illustrated and positioned in the respective selected circuit positions, it should be understood that other filters can be used for the present invention.

Other basic components included in FIG. 4 include the test points 270 near the receiver speaker 206.

Figure 5:
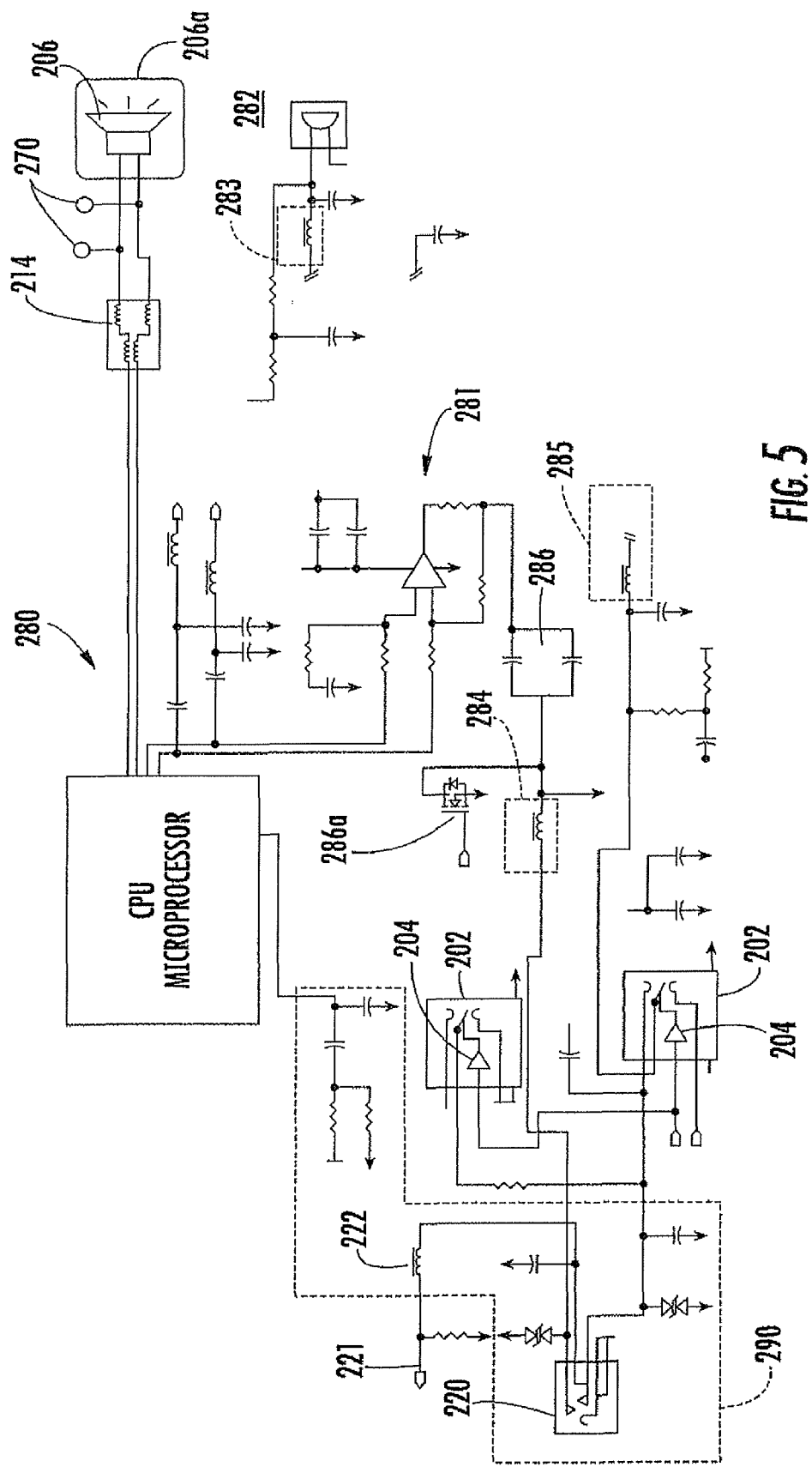
FIG. 5 is a schematic circuit diagram of another embodiment of an audio circuit similar to FIG. 4, but having a different circuit footprint.

FIG. 5 is a schematic circuit diagram for an audio circuit 280 similar to that shown in FIG. 4, including serial bus connections and having another circuit footprint, such as for a mobile wireless communications device 20, and showing similar components in a different configuration. Any similar components have been given the same reference numeral. This circuit 280 also includes an operational amplifier circuit 281 operatively connected to the microprocessor 180 and operative as a filter or buffer. FIG. 5 also shows a microphone circuit 282, which would be operative with microphone audio switches 202, even though in this fragmentary schematic circuit diagram it is shown separate. Choke filter 283 is operatively connected to the microphone circuit 282. A choke filter 284 is operatively connected to the physical jack 220 and the operational amplifier circuit 281. Another choke filter 285 is operatively connected to a microphone audio switch 202. Other circuit components can be connected as illustrated in this non-limiting example.

The choke filters are advantageously used at the frequency band about 40 MHz, which has a strong impact on the immunity performance of the radio. Critical spots are selectively chosen for these ESP filters designed in these examples as choke filters. A capacitor circuit 286 is connected between operational amplifier 281 and input jack 220 for determining connection. A transistor circuit 286a is included in this design and operatively connected between the operational amplifier circuit 281 and into connection lines for the filter 284 and input jack 220. The circuit 280 includes other components that are connected as illustrated in this non-limiting example.

By way of example, the choke filters as described with reference to FIGS. 4 and 5 could be ferrite filters, for example, ferrite beads, although other suitable filter components and/or materials may also be used, as will be appreciated by those skilled in the art. In addition to positioning the EMI filters to reduce unwanted interference, other components connected to the audio and/or serial bus circuitry can be scrutinized to determine if interference susceptibility effects.

The use of the added choke filters advantageously reduces conducted interfering energy introduced to the audio components via a serial (i.e., USB) charging cable and other sources. This further reduces radiated interfering RF energy introduced to the audio components via the microphone 112 (FIG. 3) or the microphone of a connected headset, for example.

Figure 10:
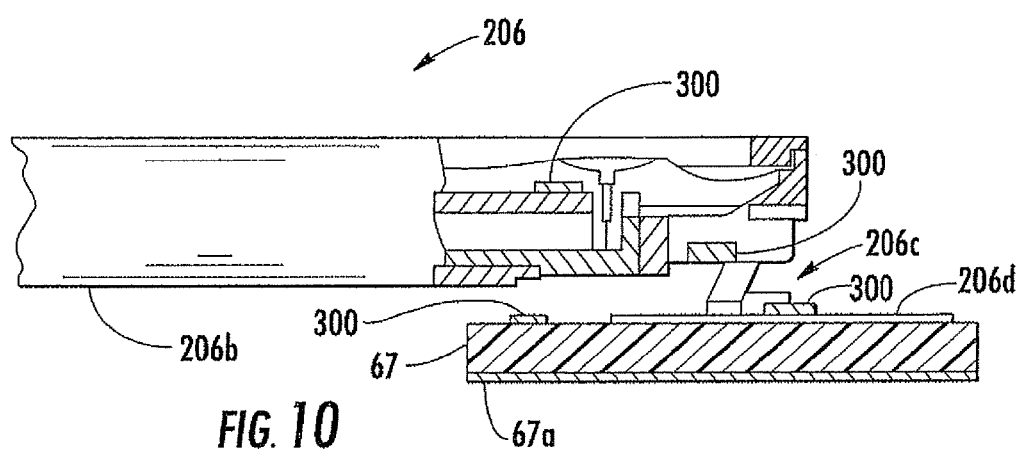
FIG. 10 is a fragmentary, side elevation and sectional view of a speaker that could be used in the circuits shown in FIGS. 1-9, and showing possible locations of the RF filter in accordance with the present invention.

As illustrated in FIG. 10, the transducer, e.g., the speaker in this example, includes a speaker housing 206b. The various components of the speaker as described above are contained in the housing. Other components could include an electrical contact 206c that engages the audio circuitry, such as the audio connection lines. The contact is typically formed as a spring contact having a contact pad member 206d. The enlarged view also shows that any contact pad 206d is surface mounted on the circuit board 67. The RF ground plane 67a is shown positioned on the underside of the circuit board. The pad can be formed large to obtain good conductive contact between the various components of the speaker 206 and the audio circuitry.

Figure 6:
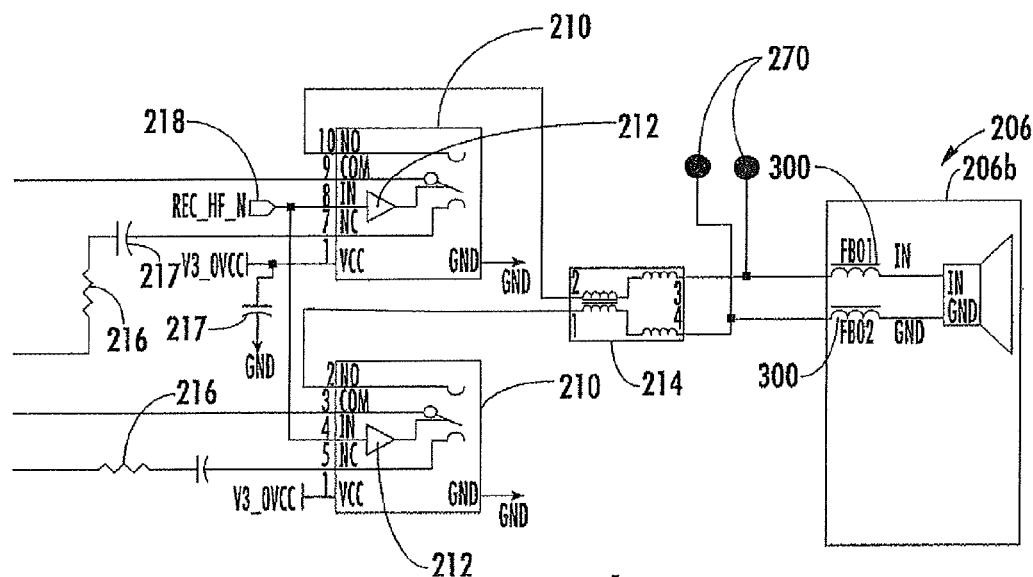
FIG. 6 is an enlarged view of the speaker section in the schematic circuit diagram of FIG. 4, and showing in detail RF filters located within the audio transducer housing.
Figure 7:
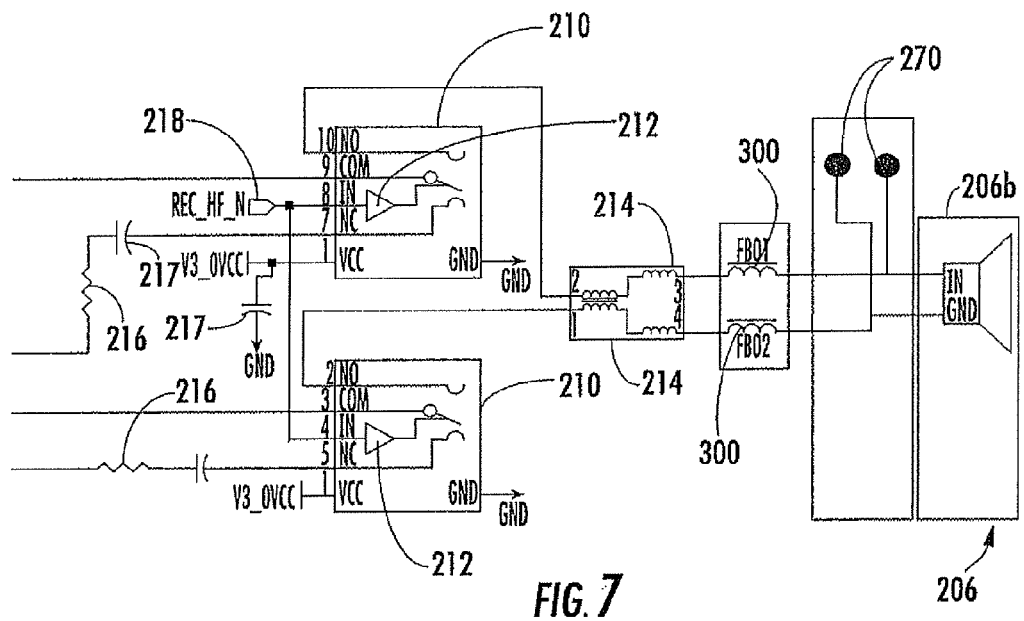
FIG. 7 is a schematic circuit diagram similar to FIG. 6, but showing the RF filters located outside the audio transducer housing and serially connected within audio connection lines.

As illustrated, a filter 300 is mounted at the audio transducer assembly, e.g., the receiver speaker 206, and reduces the radio frequency (RF) electromagnetic interference of the audio transducer assembly during device operation. Although the filter 300 could be an RF shield as shown in FIGS. 4 and 5, in FIGS. 6-9, the filter is a discrete component. As shown in FIG. 6, the filter 300 can be formed as two filter components added serially into the "in" speaker line and "ground" speaker line and positioned within the receiver or audio transducer housing 206b. The filter 300 can also be serially connected within the audio circuitry at the electrical contact and positioned outside the housing as shown in FIG. 7. In one aspect of the invention, the speaker or transducer assembly 206 includes the resilient electrical contact pads 206d that engage audio circuitry such as the audio signal lines or signal traces on a circuit board 67.

FIG. 10 shows different places where the filter could be located, including on the circuit board 67 adjacent the electrical contact formed as a contact pad 206d, between the contact pad 206d and housing 206b, or within the housing at an opportune location as indicated abstractly in FIG. 10.

In one aspect of the invention, the filter 300 could be formed as a ferrite bead or as a surface mounted filter device positioned adjacent the electrical contacts and engaging the signal traces of the audio connection lines. The filter could also be formed as a serial inductor or shunt capacitor and placed appropriately into the circuit adjacent the speaker for maximum effect.

Figure 8:
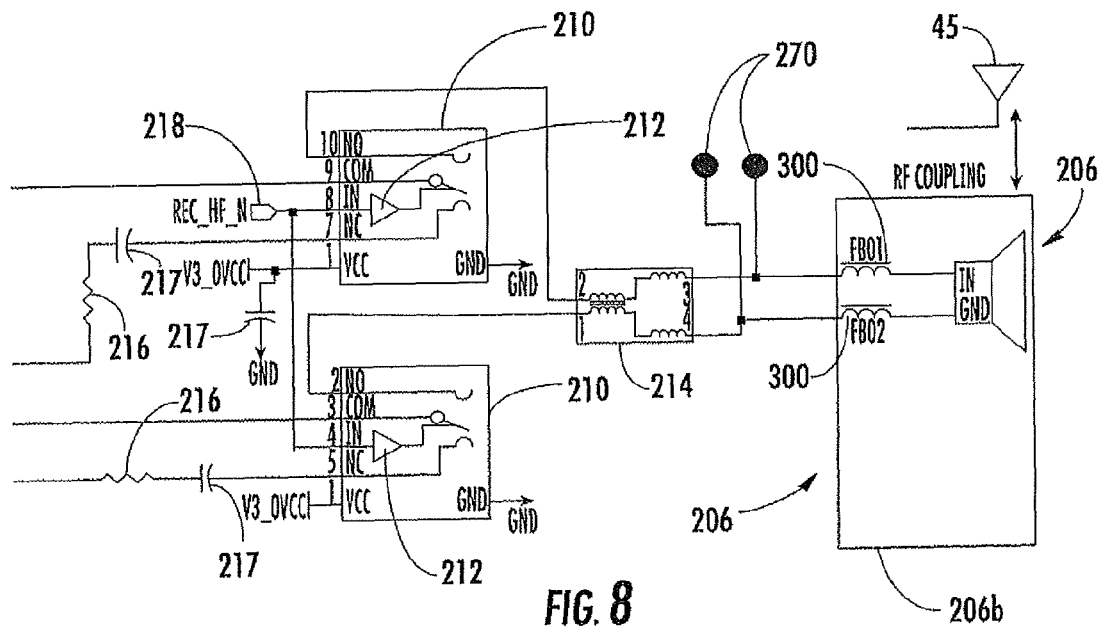
FIG. 8 is a schematic circuit diagram similar to FIG. 6 and showing the RF coupling between the speaker and antenna, which is attenuated by the RF filter contained within the audio transducer housing.
Figure 9:
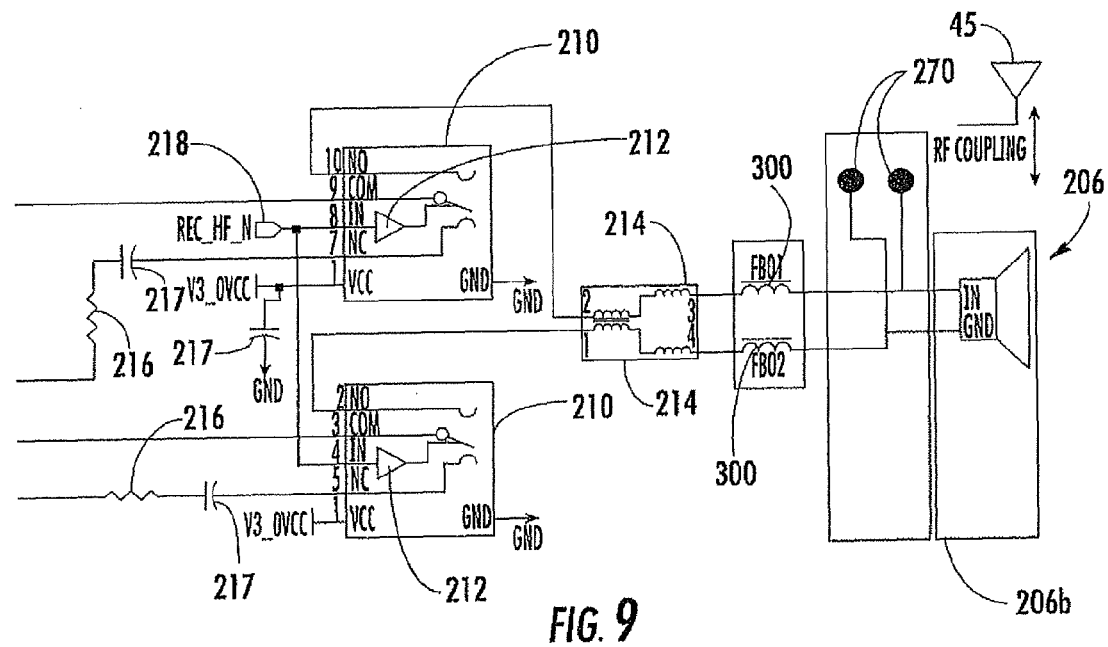
FIG. 9 is a schematic circuit diagram similar to FIG. 7 and showing the RF coupling between the speaker and antenna, which is attenuated by the RF filter outside the audio transducer housing and serially connected within audio connection lines.

FIGS. 8 and 9 are similar to respective FIGS. 6 and 7, but show that the RF filter 300 is operative for improving antenna performance by blocking RF current from being coupled to the ground plane 67a of the printed circuit board by the close and adjacent electronic components. The speaker 206 can be located close to the antenna and couple RF energy from the antenna to the ground plane and cause antenna impedance match detuning and antenna gain degradation. The RF filter, such as RF EMI ferrite beads 300, are serially connected to both ends of the speaker and have low DC resistance to allow normal operation of the speaker, but have high impedance over 500 MHz up to about 3 GHz. The RF current is effectively blocked from being coupled to the ground plane and other circuitry on the printed circuit board and decoupling the antenna from adjacent electronic components. Thus, the antenna performance, such as impedance matching antenna gain is maintained by the invention.

This application is related to copending patent application entitled, "MOBILE WIRELESS COMMUNICATIONS DEVICE HAVING IMPROVED ANTENNA IMPEDANCE MATCH AND ANTENNA GAIN FROM RF ENERGY" which is filed on the same date and by the same assignee and inventors.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
a housing;
at least one circuit board carried by the housing;
radio frequency (RF) circuitry and a processor operative therewith and carried by said at least circuit board;
an audio transducer assembly carried by said at least one circuit board and comprising an audio transducer, a transducer housing for said audio transducer, and at least one electrical contact pad member on said transducer housing and coupled to said audio transducer;
audio circuitry comprising at least one signal trace on said at least one circuit board and engaging said electrical contact pad member;
at least one first filter coupled with said at least one signal trace; and
at least one second filter mounted at said electrical contact pad member.

2. The mobile wireless communications device according to claim 1, wherein said electrical contact pad member comprises a plurality of resilient contact pads.

3. The mobile wireless communications device according to claim 1, wherein said at least one second filter comprises a plurality thereof connected adjacent respective resilient contact pads.

4. The mobile wireless communications device according to claim 2, wherein said at least one second filter comprises at least one ferrite bead.

5. The mobile wireless communications device according to claim 1, wherein said at least one second filter comprises at least one surface mount filter.

6. The mobile wireless communications device according to claim 1, wherein said audio transducer assembly comprises a speaker within said transducer housing.

7. The mobile wireless communications device according to claim 1, wherein one of said plurality of circuit boards comprises an antenna circuit board.

8. A mobile wireless communications device comprising:
a housing;
at least one circuit board carried by the housing;
radio frequency (RF) circuitry and a processor operative therewith and carried by said at least circuit board;
an audio transducer assembly carried by said at least one circuit board and comprising an audio transducer, a transducer housing for said audio transducer, and at least one electrical contact pad member on said transducer housing and coupled to said audio transducer;

audio circuitry comprising at least one signal trace on said at least one circuit board and engaging said electrical contact pad member;

at least one first filter coupled with said at least one signal trace; and at least one second filter mounted within said transducer housing.

9. The mobile wireless communications device according to claim 8, wherein said electrical contact pad member comprises a plurality of resilient contact pads.

10. The mobile wireless communications device according to claim 8, wherein said at least one second filter comprises at least one ferrite bead.

11. The mobile wireless communications device according to claim 8, wherein said at least one second filter comprises at least one surface mount filter.

12. The mobile wireless communications device according to claim 8, wherein said audio transducer assembly comprises a speaker within said transducer housing.

13. The mobile wireless communications device according to claim 8, wherein one of said plurality of circuit boards comprises an antenna circuit board.

14. A method for making a mobile wireless communications device comprising:

providing at least one circuit board within a housing, and with radio frequency (RF) circuitry and a processor operative therewith and carried by the at least circuit board;

mounting an audio transducer assembly to the at least one circuit board and comprising an audio transducer, a transducer housing for the audio transducer, and at least one electrical contact pad member on the transducer housing and coupled to the audio transducer;

providing audio circuitry comprising at least one signal trace on the at least one circuit board and engaging the electrical contact pad member;

coupling at least one first filter with the at least one signal trace; and mounting at least one second filter at the electrical contact pad member.

15. The method according to claim 14, wherein the electrical contact pad member comprises a plurality of resilient contact pads.

16. The method according to claim 15, wherein the at least one second filter comprises a plurality thereof connected adjacent respective resilient contact pads.

17. The method according to claim 14, wherein the at least one second filter comprises at least one ferrite bead.

18. The method according to claim 14, wherein the at least one second filter comprises at least one surface mount filter.

19. A method for making a mobile wireless communications device comprising:

providing at least one circuit board within a housing, and with radio frequency (RF) circuitry and a processor operative therewith and carried by the at least circuit board;

mounting an audio transducer assembly to the at least one circuit board and comprising an audio transducer, a transducer housing for the audio transducer, and at least one electrical contact pad member on the transducer housing and coupled to the audio transducer;

providing audio circuitry comprising at least one signal trace on the at least one circuit board and engaging the electrical contact pad member;

coupling at least one first filter with the at least one signal trace; and mounting at least one second filter within the transducer housing.

20. The method according to claim 19, wherein the electrical contact pad member comprises a plurality of resilient contact pads.

21. The method according to claim 19, wherein the at least one second filter comprises at least one ferrite bead.

22. The method according to claim 19, wherein the at least one second filter comprises at least one surface mount filter.

* * * * *

UNITED STATES PATENT AND TRADEMARK OFFICE
CERTIFICATE OF CORRECTION

PATENT NO. : 8,099,142 B2
APPLICATION NO. : 13/073293
DATED : January 17, 2012
INVENTOR(S) : Zhu et al.

Page 1 of 1

It is certified that error appears in the above-identified patent and that said Letters Patent is hereby corrected as shown below:

Column 12, Line 43,   Delete "1"
Claim 3              Insert --2--

Signed and Sealed this
Second Day of October, 2012

David J. Kappos
*Director of the United States Patent and Trademark Office*